(12) United States Patent
Van Der Walt et al.

(10) Patent No.: US 8,212,091 B2
(45) Date of Patent: Jul. 3, 2012

(54) DEPOLYMERIZATION OF FLUOROPOLYMERS

(75) Inventors: Izak Jacobus Van Der Walt, Krugersdorp North (ZA); Alfred Teo Grunenberg, Noordheuwel (ZA); Johannes Theodorus Nel, Birchleigh (ZA)

(73) Assignee: The South African Nuclear Energy Corporation Limited, District Brits (ZA)

( * ) Notice: Subject to any disclaimer, the term of this patent is extended or adjusted under 35 U.S.C. 154(b) by 779 days.

(21) Appl. No.: 12/085,536

(22) PCT Filed: Nov. 24, 2006

(86) PCT No.: PCT/IB2006/054414
§ 371 (c)(1),
(2), (4) Date: Dec. 23, 2008

(87) PCT Pub. No.: WO2007/063462
PCT Pub. Date: Jun. 7, 2007

(65) Prior Publication Data
US 2009/0149679 A1 Jun. 11, 2009

(30) Foreign Application Priority Data
Nov. 30, 2005 (ZA) .................................. 2005-09703

(51) Int. Cl.
*C07C 17/361* (2006.01)
(52) U.S. Cl. .......................... 570/152; 570/136; 570/153
(58) Field of Classification Search ........................ None
See application file for complete search history.

(56) References Cited

U.S. PATENT DOCUMENTS

| 3,663,592 A | 5/1972 | Banitt |
| 5,432,259 A * | 7/1995 | Schottle et al. ............... 528/481 |
| 5,635,585 A | 6/1997 | Drysdale et al. |
| 5,770,678 A | 6/1998 | Drysdale et al. |
| 2004/0241573 A1 | 12/2004 | Ray et al. |

FOREIGN PATENT DOCUMENTS

| JP | 62109839 | 5/1987 |
| JP | 6-298994 | 10/1994 |
| ZA | 2001/02431 | 10/2001 |

OTHER PUBLICATIONS

PCT International Search Report and Written Opinion for International Patent Application No. PCT/IB2006/054414.
GCC Search Report for Patent Application No. GCC/P/2006/7287.

* cited by examiner

*Primary Examiner* — Sudhakar Katakam
(74) *Attorney, Agent, or Firm* — Winston & Strawn LLP

(57) ABSTRACT

A process for depolymerizing fluoropolymers includes continuously feeding a solid fluoropolymer, in particulate form, into a horizontal cylindrical first reaction zone. The fluoropolymer particles enter the first reaction zone at one end. Within the first reaction zone, a central axle from which protrudes at least one paddle, continuously rotates. The rotating paddle serves to advance the fluoropolymer particles along the reaction zone while agitating them. As the fluoropolymer particles pass along the reaction zone, they are subjected to an elevated temperature, thereby depolymerizing the fluoropolymer into a fluoro-containing compound-rich gas phase. A residual solids phase is withdrawn at the other end of the first reaction zone, as is the gas phase. Optionally, the gas phase is passed through a second reaction zone which is also at an elevated temperature. The gas phase is quenched, thereby to recover the fluoro-containing compounds as gaseous products.

12 Claims, 1 Drawing Sheet

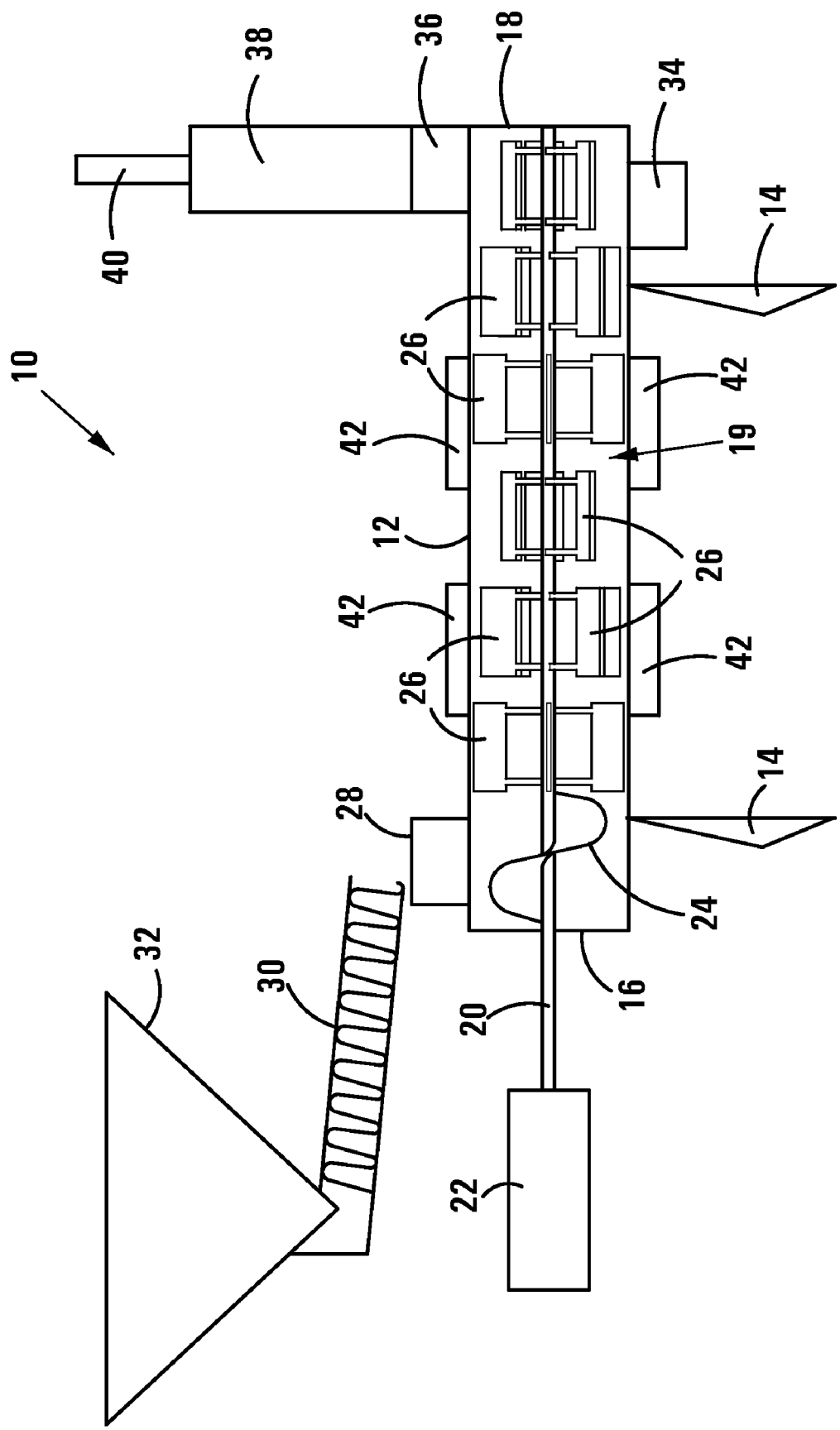

DEPOLYMERIZATION OF FLUOROPOLYMERS

According to a first aspect of the invention, there is provided a process for depolymerizing fluoropolymers, which includes
continuously feeding a solid fluoropolymer, in particulate form, into a more-or-less horizontally orientated cylindrical first reaction zone, with the fluoropolymer particles entering the first reaction zone at or near one end thereof;
continuously rotating, within the first reaction zone, a central axle from which protrudes at least one paddle, with the rotating paddle serving to advance the fluoropolymer particles along the first reaction zone while agitating them;
as the fluoropolymer particles pass along the first reaction zone, subjecting them to an elevated temperature, thereby to depolymerise the fluoropolymer into a fluoro-containing compound-rich gas phase;
if necessary, withdrawing a residual solids phase at or near the other end of the first reaction zone;
withdrawing the gas phase at or near the other end of the first reaction zone;
optionally, passing the gas phase through a second reaction zone which is also at an elevated temperature; and
quenching the gas phase, thereby to recover the fluoro-containing compounds as gaseous products.

While the fluoropolymer can contain only carbon and fluorine atoms, it may, in some embodiments, contain also hydrogen atoms, and even heteroatoms such as oxygen or chlorine.

The fluoropolymer may be a filled or an unfilled not directly usable material such as polytetrafluoroethylene ('PTFE'), tetrafluoroethylene hexafluoropropylene vinylidenefluoride ('THV'), fluorinated ethylene-propylene copolymer ('FEP'), perfluoroalkoxy copolymer ('PFA'), or the like. By 'filled' is meant that the fluoropolymer may contain elements or substances such as silica (glass), copper, bronze, carbon (graphite), etc which were originally added to fluoropolymer to impart specific properties thereto. Once such material has been used and has thus become, mechanically, a not directly usable material, but suitable for use as the feedstock in the method of the invention, it will still contain these filling elements. In the method of the invention, these fluoropolymers are depolymerized, and the more desirable fluoro-containing compounds formed therefrom.

If desired or necessary, the solid particulate feedstock may be pretreated to remove surface contaminants such as oil and dirt, eg by means of solvent extraction, washing or a preheating step to oxidize the dirt and oil contaminants.

More particularly, the fluoropolymer may be polytetrafluoroethylene ('PTFE') with the fluoro-containing compounds including tetrafluoroethylene ('TFE'), hexafluoropropylene ('HFP'), hexafluoroethane ('HFE'), octafluoropropane ('OFP') and octafluorocyclobutane ('OFCB') and its isomers.

The feedstock particles, ie the fluoropolymer particles, may vary in size from 5 mm particles up to chunks of a few centimeters.

The residual solids phase may comprise undepolymerized fluoropolymer and/or precipitated filler materials present in the fluoropolymer.

The more-or-less horizontally orientated cylindrical first reaction zone may be provided by a tubular reactor, which is thus located more-or-less horizontally.

A plurality of sets of paddles or blades may be provided in the tubular reactor, with the blades of one set being spaced longitudinally along the axle relative to those of an adjacent set. Each set of blades may thus comprise a number of blades spaced apart around the axle.

The outer edges of the blades or paddles will then pass along the inner periphery of the tubular reactor with scraping clearance so that any material that adheres to the wall of the reactor is thereby dislodged. The paddle arrangement comprising the rotating axle and the paddles, may include a screw on the one end of the axle adjacent to an inlet of the reactor for supplementary advancement of the solid particles before depolymerization. The general dimensions (length of screw, pitch of the screw, number of paddles, spacing of paddles, scraping clearance, etc) of the screw and the paddles may vary.

The tubular reactor may, in particular, be a stationary reactor provided with suitable heating means. The heating means may comprise a series of resistance heaters, induction heaters, gas or oil burners, or any other appropriate means. The arrangement of the heating means may define different heating zones which may be at different temperatures.

While the tubular reactor can be located horizontally, it can also, if desired, be located at a slight angle to the horizontal, eg up to about 10° above or below the horizontal.

The rotational speed of the axle may be between 1 and 20 rpm, typically between 1 and 5 rpm. The speed of the axle may be variable.

The rotational speed of the axle, and hence the rotational speed of the blades, as well as the angle of inclination of the reactor relative to the horizontal, also constitute variables for adjusting the product make-up or composition.

The elevated temperature in the tubular reactor may be from 400° C. to 1000° C. The reaction pressure in the tubular reactor may be either below or above atmospheric pressure, eg may be from 1 to 300 kPa(a), typically from 5 to 88 kPa(a).

It will be appreciated that the reaction conditions, ie the reaction temperature, the reaction pressure and the residence time of the fluoropolymer particles in the reactor, can be selected so as to produce desired ratios of fluoro-containing compounds relative to each other or even to optimize the production of a particular fluoro-containing compound such as high purity TFE.

The second reaction zone will also be provided by a reactor.

The second or post reactor, when present, can be used to assist in optimizing the production of a particular compound or of different ratios of compounds relative to each other, and functions by increasing the residence time of the fluoro-containing compound-rich gas phase. The reaction conditions, ie the reaction temperature and the reaction pressure, in the second reactor may thus be similar to those in the tubular reactor; however, it is to be appreciated that they can instead be different.

Typically, the residence time in the tubular reactor can range from 1 to 30 minutes, while the residence time in the second reactor will typically be less than about 5 minutes.

The post reactor may operate within a temperature range of 100° C. to 1000° C. and may operate at a different temperature than the tubular reactor, and within a pressure range of 1 kPa to 300 kPa(a). The residence time inside the post reactor depends on the specific product composition that is desired. For longer chain products ($>C_4$) the residence times are generally longer than for shorter chain products ($\leqq C_4$). It is, however, very important to quench the product after the post reactor in order to form the desired product composition and to prevent the formation of undesired compounds like the very toxic perfluoroisobutylene ('PFIB').

By 'quenching' is meant that the gas phase is cooled down from the reaction temperature of 400° C. to 1000° C. to less than about 200° C. in less than 1 second.

The process is characterized thereby that it does not require the use of a carrier gas such as steam or an inert gas, ie the fluoropolymer particles can be depolymerised in the absence of a carrier gas; however, the depolymerization can arbitrarily be effected with such a carrier gas for a particular purpose, if desired.

According to a second aspect of the invention, there is provided an installation for depolymerizing fluoropolymers, which installation includes a more-or-less horizontally orientated tubular reactor;
feed means for feeding a solid fluoropolymer, in particulate form, into the tubular reactor, at or near one end thereof;
a paddle arrangement in the tubular reactor, with the paddle arrangement comprising a central axle, drive means for driving the axle to rotate, and at least one paddle protruding from the axle;
heating means for heating the inside of the tubular reactor;
solid phase withdrawal means at or near the other end of the tubular reactor;
gas phase withdrawal means at or near the other end of the tubular reactor;
optionally, a second heatable reactor operatively connected to the gas phase withdrawal means of the tubular reactor; and
quench means for quenching a gas phase that is withdrawn from the tubular reactor or from the second reactor.

The tubular reactor may, in particular, be a stationary reactor.

The paddle or blade may be sized such that it passes with limited clearance along the inner surface of the tubular reactor, in order to dislodge any material that adheres to the inner surface.

The heating means may comprise at least one resistance heater in or on the tubular reactor. For example, a series of resistance heaters may be provided. Instead, the heating means may comprise an induction heater, a gas burner, an oil burner, or the like. The heating means may be arranged to define different heating zones in the reactor, with the different heating zones being heatable to different temperatures.

The solid phase withdrawal means may comprise a conduit leading from the reactor, with the conduit being fitted with a suitable valve means. Similarly, the gas phase withdrawal means may comprise a conduit fitted with suitable valve means.

The quench means may comprise a quench probe, which may be the same or similar to that described in WO 01/58584 which is incorporated herein by reference.

The second reactor may also be a tubular reactor fitted with heating means such as a resistance heater.

The feed means may comprise a hopper and conduit arrangement adapted to feed the particulate fluoropolymer into the reactor at said one end thereof.

The solid phase and gas phase withdrawal means may be similar to those of known tubular reactors, and may be provided with suitable seal means to maintain pressure levels inside the tubular reactor.

The invention will now be described in more detail with reference to the accompanying diagrammatic drawing, which shows an installation for depolymerizing fluoropolymers, according to the invention.

In the drawing, reference numeral 10 generally indicates an installation according to the invention, for depolymerizing fluoropolymers.

The installation 10 includes a horizontally orientated tubular paddle oven reactor 12, mounted on stands 14. While the reactor 12 is shown orientated exactly horizontally, it can, if necessary, be tilted at angles slightly above or below the horizontal, ie up to 10° above or below the horizontal. In other words, the reactor 12 can be tilted so that its far end 18 is located at a higher level than its near end 16, or can be tilted so that its far end is located at a lower level than its near end 16. In such case, it shall naturally be provided with suitable adjustment means (not shown) for adjusting its degree of tilt, eg with a cradle-like fulcrum mounted on one of the stands 14 and a hydraulic or mechanical height adjusting drive supportively mounted on the other stand 14. Alternatively, the reactor may have a pivot point at the centre of a support framework. Manual or automatic means for adjusting the height may be used, and may be situated on either end of the reactor so that the reactor pivots to a position above or below the horizontal.

The reactor 12 includes a paddle arrangement 19 comprising a central axle 20 which is rotatably mounted in the ends 16 and 18 of the reactor, and which is provided with drive means in the form of a speed controllable electric motor 22. At the near end 16 of the reactor, a feed screw 24 is provided around the axle 20. A plurality of circumferentially and longitudinally spaced paddles or blades 26 protrude radially outwardly from the axle 20. Each blade or paddle 26 may be in the form of a solid plate. Instead, however, each blade 26 may be in the form of one or more spokes protruding outwardly from the axle and a blade or paddle component mounted to the distal ends of the spokes. The paddles or blades 26 are sized such that they pass with limited or scraping clearance around the inside of the wall of the reactor 12 as the axle 20 rotates.

A number of sets of the blades or paddles 26 are thus provided, with each set of blades being spaced longitudinally along the axle 20 relative to an adjacent set of blades. Each set of blades comprises a number of blades, eg 4, circumferentially or symmetrically spaced about the axle 20. The blades or paddles 26 of one set are staggered relative to those of an adjacent set, when the arrangement 19 is viewed end-on.

By means of the speed control motor 22, the rotational speed of the axle 20 and hence of the screw 24 and paddles 26, can be varied between 1 and 20 rpm, eg between 1 and 5 rpm.

A polymer inlet 28 is provided in the reactor near its end 16, with a screw feeder 30 leading from a fluoropolymer hopper 32 to the inlet 28.

A solids phase outlet 34 is provided in the reactor at the end 18, as is a gas phase outlet 36. The outlet 34 is provided with a double valve system (not shown) for withdrawing solid phase while maintaining reactor pressure.

The reactor 12 is also provided with pressure control means (not shown) for controlling the pressure in it. The pressure control means may comprise a vacuum pump connected downstream of the gaseous outlet 36 and suitable vacuum seals on the central axis where it is rotatably mounted in the ends 16 and 18 of the reactor.

A second or post reactor 38, which is also of tubular form and which is provided with a resistance heater, is mounted vertically to the outlet 36, while a quench probe 40 is in turn mounted to an outlet of the reactor 38. The quench probe 40 is self-cleaning, and can be as described in WO 01/58584 which is hence incorporated herein by reference.

The quench probe 40 thus includes an elongate water cooled cylindrical outer component. The outer component has a central passageway into which protrudes equally spaced elongate radially inwardly protruding teeth or scrapers (not shown). Inside the passageway of the outer component is located, with peripheral clearance, an elongate water cooled cylindrical inner component (not shown). Equally spaced elongate radially outwardly protruding teeth or scrapers (not shown) are provided on the inner component, with the teeth of the one component being spaced circumferentially from the teeth on the other component. The teeth may extend the full length of the inner and outer components, and the inner and outer components may be of substantially the same length. The inner component is provided with drive means (not shown) such as a spring loaded piston driven arm, for driving it to oscillate relative to the outer component. Removal of solid contaminants from the inner and outer components is thus achieved by the oscillating teeth.

The quench probe 40 is thus a double annular water cooled probe designed to cool the gas phase that forms inside the reactor 12, down from 600° C. to 800° C. to below 200° C., eg to ambient temperature, in less than 1 second. The probe is self-cleaning to prevent blockages thereof since solidified or sublimated material forms on the surfaces of the probe in use.

The reactor 12 is heated by means of a plurality of longitudinally spaced resistance heaters 42.

In use, particles of a filled or unfilled solid fluoropolymer, eg PTFE, are fed from the hopper 32, by means of the screw feeder 30, into the reactor inlet 28. Initially the particulate fluoropolymer is advanced along the reactor by means of the screw 24, whereafter its further general advancement along the reactor is effected by means of the rotating paddles 26, which also serve simultaneously to agitate the particles. The rotating paddles 26 enhance continuous movement, and consequently also heat transfer, of the fluoropolymer through the reactor 12. The paddles 26 also provide a scraping action that constantly dislodges any particles or polymer melt from the wall of the reactor 12.

The fluoropolymer particles may range in size from about 5 mm up to chunks of a few centimeters, depending on the size of the reactor 12 and feeder 30 combination.

The process is characterized thereby that no carrier gas such as steam or an inert gas is introduced into the reactor 12, although such a carrier gas may be introduced deliberately for certain effects or applications.

When a fluoropolymer such as PTFE is depolymerised, it undergoes several phase changes. As indicated, it is introduced into the reactor in the form of solid particles. When heated, it is transformed into a viscous, liquid state and eventually sublimates into a mixture of fluoro-containing compounds in gaseous form.

The reactor 12 thus has a number of operational parameters, which will dictate the rate of product formation, ie the rate at which the fluoro-containing gaseous product compounds are formed, as well as the product composition or slate. These parameters are reaction temperature, reaction pressure, rotational speed of the axle 20 and hence the paddles 26, the rate at which the polymer is fed into the reactor, the reactor inclination or tilt angle and the residence time of the fluoropolymer particles in the reactor.

By using more than one resistance heater, different temperature zones can be created inside the reactor 12. For example, a preheating first zone of the reactor, extending about one-half of its length from its end 16, and an adjacent high temperature zone in a second portion of the reactor, where depolymerization takes place and/or where complete depolymerization is ensured, may be provided.

The post reactor 38 is also typically provided with resistance heaters, and its function is to increase the residence time of the product gas exiting from the reactor 12 through the gaseous outlet 36.

If desired, the post reactor 38 may be positioned further away from the paddle reactor 12. A quench probe (not shown) and a filter (not shown) may then be positioned between the paddle reactor 12 and the post reactor 38.

A number of experiments were conducted on a laboratory setup in accordance with the installation 10. In the laboratory scale installation, the reactor 12 had the following dimensions: 150 mm diameter and 1 m long. Two resistance heaters supplied heat to the reactor which had 10 sets of 4 paddles 26 each on the central axis 20. The pressure inside the reactor was regulated by a valve mounted on top of a vacuum pump. The outlet of the vacuum pump was connected to an analytical system where an inline gas chromatograph (GC) analyzed the product gas on a continuous basis.

In each of the experimental runs, 5 kg of fluoropolymer was continuously fed into the reactor 12 by means of the hopper 32 and the screw feeder 30. It will be appreciated that the speed of the screw feeder 30 can be adjusted to change the feedstock feed rate. No carrier gas such as steam or an inert gas was introduced into the reactor 12.

The reactor 12 was fitted with 2 resistance heaters arranged side-by-side along the length of the reactor, with the resistance heaters having a combined power input of 6 kW. By using more than one such heater, different temperature zones can be achieved inside the reactor 12, as hereinbefore described.

All solid filler and undepolymerized materials (residues) were discharged, as a solids phase, through the solids outlet 34 using a double valve system (not shown) and collected in a waste container (not shown).

The gas phase containing the fluoro-containing compounds that formed as the fluoropolymer depolymerised, was discharged through the gas outlet 36. In this laboratory setup, the post reactor 38 was not present; instead, a self-cleaning oscillating quench probe 40 was mounted directly to the outlet 36, in a vertical orientation. Quenching, ie the rapid cooling down of the product gases from the reaction temperature of 400° C. to 1000° C. to less than 200° C. in less than 1 second, is essential in order to reduce formation of undesired compounds such as poisonous PFIB and to manipulate the final product composition. A further purpose of the vertical self-cleaning quench probe is to scrape off all solids that are deposited onto its cold surfaces. This fine powder falls back into the reactor 12 where it can be further depolymerized or discharged via the solids outlet 34.

The reactor 12 and quench probe 40 could be operated at pressures above or below atmospheric pressure. By controlling the pressure, the yield and composition of the product slate can be manipulated. Controlling the pressure at above atmospheric pressure is effected by means of natural pressure accumulation in the reactor and a regulated pressure relief valve, while controlling the pressure at below atmospheric pressure is effected by means of a vacuum pump (not shown) and suitable vacuum seals (not shown) and a choke valve upstream of the vacuum pump.

EXAMPLE 1

A series of test runs were conducted on a laboratory scale installation 10.

Before each test run the reactor was evacuated in order to substantially remove all air and moisture.

In the respective runs, 5 kg of graphite-, glass- and bronze-filled PTFE, unfilled PTFE, tetrafluoroethylene-hexafluoropropylene-vinylidine fluoride ('THV'), fluorinated ethylene propylene copolymer ('FEP') or perfluorinated-alkoxy ("PFA") were fed, in particulate form, into the reactor 12 for depolymerization. The fluorine-containing product compounds were withdrawn as a gas phase through the reactor outlet 36 and subjected to quenching in the quench probe 40. Any solid residue was collected through the solids outlet 34.

In each case the reactor temperature and pressure combination was varied. The experimental results are given in Tables 1 to 5 hereunder.

Table 1 summarises the results of filled as well as un-filled PTFE depolymerization. Some unexplained scatter was observed among the results, eg for bronze filled PTFE, but substantially the trends for product composition of depolymerization products were found to be consistent with similar published results. Generally the TFE concentration peaked at about 600° C. and at pressures of about 20 kPa and less. With increasing pressure and temperature the TFE concentration dropped and HFP and OFCB concentrations increased. The formation of HFE and OFP occurred as was expected at higher pressures (>50 kPa) and at temperatures that are above 800° C.

Table 2 summarises experiments that were performed on the depolymerization of PFA. Experiments were performed at lower temperatures (<600° C.) because of a lower melting point of PFA as apposed to PTFE. The results were similar to that seen during PTFE depolymerization. At low pressures the TFE concentration peaked at more than 97 molar % and the HFP and OFCB concentrations were at a minimum. At higher pressure levels the TFE concentration decreases to about 40% and the HFP and OFCB concentrations increased.

Table 3 summarises the depolymerization data for FEP depolymerization. Once again the same trends are observed. The TFE concentration decreases and the HFP and OFCB concentrations generally increase as the pressure increases.

Table 4 is a summary of the depolymerization experiments for THV. Again similar trends were obtained as with PTFE, PFA and FEP.

Table 5 is a comparison of the waste that is generated when different fluoropolymers are depolymerised according to the present invention as opposed to using steam for the depolymerization. From this set of data it is conclusive that steam depolymerization generates 2-3 orders of magnitude more waste than carrier-gas free depolymerization at controlled pressures.

TABLE 1

Typical results obtained from depolymerization of filled and unfilled PTFE in the reactor

| Filler | Pressure kPa (abs) | Temp ° C. | $CF_4$ % | HFE % | TFE % | OFP % | HFP % | OFCB % | $C_4F_8$ % |
|---|---|---|---|---|---|---|---|---|---|
| None | 21 | 612 | 0 | 0 | 81.4 | 0 | 12.4 | 6.0 | 0 |
| None | 82 | 805 | 0 | 9.0 | 12.8 | 4.5 | 61.0 | 10.7 | 1.7 |
| Glass | 5 | 600 | 0 | 3.3 | 92.5 | 0 | 4.1 | 0 | 0 |
| Glass | 92 | 818 | 0 | 0.7 | 88.5 | 0 | 9.9 | 0.9 | 0 |
| Graphite | 5 | 600 | 0 | 2.0 | 75.2 | 0 | 3.4 | 0 | 19.2 |
| Graphite | 27 | 864 | 2.2 | 3.9 | 93.9 | 0 | 0 | 0 | 0 |
| Bronze | 91 | 600 | 0 | | 94.8 | 0 | 5.1 | 0 | 0 |
| Bronze | 33 | 869 | 0 | 5.2 | 59.0 | 1.2 | 32.6 | 0 | 1.7 |

0 = not detected

TABLE 2

Typical results obtained by the depolymerization of PFA

| Temp ° C. | Pressure kPa (abs) | $CF_4$ % | HFE % | TFE % | OFP % | HFP % | OFCB % | $C_4F_8$ % |
|---|---|---|---|---|---|---|---|---|
| 600 | 10 | 2 | 0.5 | 97.5 | 0 | 0 | 0 | 0 |
| 570 | 40 | 0 | 0 | 53.0 | 0 | 24.7 | 22.3 | 0 |
| 525 | 60 | 0 | 0 | 41.9 | 0 | 24.8 | 12.4 | 20.7 |

0 = not detected

TABLE 3

Typical results obtained by the depolymerization of FEP

| Temp ° C. | Pressure kPa (abs) | TFE % | HFP % | OFCB % | $C_4F_8$ % |
|---|---|---|---|---|---|
| 830 | 30 | 52.1 | 37.8 | 10.1 | 0 |
| 829 | 60 | 30.2 | 49.9 | 17.4 | 0 |
| 830 | 100 | 25.1 | 52.4 | 17.9 | 0 |
| 835 | 120 | 17.3 | 63.7 | 13.8 | 0 |
| 780 | 20 | 62.3 | 32.2 | 5.4 | 0 |
| 782 | 50 | 46.5 | 36.6 | 16.7 | 0 |
| 782 | 80 | 32.5 | 40.8 | 26.6 | 0 |
| 780 | 100 | 25.3 | 42.3 | 27.9 | 0 |
| 780 | 120 | 23.1 | 43.9 | 28.0 | 0 |
| 750 | 30 | 56.3 | 29.9 | 6.8 | 7.0 |
| 750 | 60 | 33.9 | 22.1 | 9.3 | 0.3 |
| 755 | 90 | 32.6 | 39.2 | 26.3 | 1.0 |
| 750 | 120 | 29.3 | 39.8 | 30.2 | 0.7 |

0 = not detected

TABLE 4

Typical results obtained by the depolymerization of THV

| Temp ° C. | Pressure kPa (abs) | HFE % | TFE % | OFP % | HFP % | OFCB % | $C_4F_8$ + other % |
|---|---|---|---|---|---|---|---|
| 700 | 10 | 0.3 | 92.1 | 0 | 6.4 | 0.3 | 0.9 |
| 700 | 50 | 0.3 | 81.7 | 0 | 11.1 | 5.7 | 1.1 |
| 700 | 80 | 0.2 | 79.7 | 0 | 11.5 | 7.8 | 0.6 |
| 800 | 10 | 0.3 | 87.5 | 0.2 | 9.2 | 1.3 | 1.5 |
| 800 | 50 | 0.3 | 74.6 | 0.2 | 16.1 | 6.4 | 2.2 |
| 800 | 80 | 2.3 | 48.3 | 3.5 | 32.8 | 10.6 | 1 |

0 = not detected

TABLE 5

Typical results of the amount of waste (un-depolymerized material) collected at the solid discharge of the oven.

| Material | Total mass feed through hopper (kg) | Waste collected at discharge (kg/kg feed) |
|---|---|---|
| PTFE (unfilled) | 5.0 | 0.050 |
| PTFE (bronze-filled) | 5.0 | 0.250-0.300 |
| PTFE (graphite-filled) | 5.0 | 0.250-0.300 |
| PTFE (glass-filled) | 5.0 | 0.250-0.300 |

TABLE 5-continued

Typical results of the amount of waste (un-depolymerized material) collected at the solid discharge of the oven.

| Material | Total mass feed through hopper (kg) | Waste collected at discharge (kg/kg feed) |
|---|---|---|
| THV | 5.0 | 0.050 |
| PFA | 5.0 | 0.050 |
| FEP | 5.0 | 0.050 |
| PTFE Steam depolymerization* | 1.0 | 15-28 |

*These values were obtained from literature.

EXAMPLE 2

A further series of tests was conducted on the same laboratory setup as in Example 1, to confirm the results of Example 1 and to demonstrate the versatility of the preferred embodiment regarding depolymerisation of filled PTFE in terms of the selectivity of the yield of monomers like TFE, HFP and OFCB even without the post reactor 38 and further to demonstrate more specifically the effectiveness of the polishing post reactor 38 in fine tuning the selectivity. It also confirmed that the polymer matrix can be completely separated from the filler material and be depolymerised effectively and reproducibly. For the sake of good comparison these tests were performed using one filler type only. Graphite filled PTFE was selected because of its abundant availability as scrap and the inertness of this particular filler material.

As with Example 1, the essential process parameters of temperature, pressure, residence time (and hence reactor inclination and paddle rotation rate) and feed rate were predetermined by the desired product mix. As the particulate filled PTFE is moved through the hot reactor 12 by the combined action of the screw 24 and paddles 26, the PTFE sublimates and depolymerises resulting in the filler material being separated from the product gas. The solid residue moves through the whole reactor with close contact to the hot sides, ensuring high depolymerization efficiency (>80%). After complete depolymerization of the fluoropolymer matrix the filler material drops into outlet 34 where the filler is batch wise extracted without compromising the reactor integrity and leak tightness. The product gas leaves the reactor via outlet 36 through quench probe 40. The final product gas is then filtered and analysed by means of a GC as well as a GCMS, ie a gas chromatograph followed in series by a mass spectrometer.

rate was maintained constant, but not optimised. This is why significant quantities of the non-monomeric chains like HFE and OFP as well as the undesired toxic PFIB were observed. The trends of the TFE, HFP and OFCB were nevertheless similar to those of PTFE depolymerization in a well controlled small vertical reactor as described in WO 01/58584. The higher the pressure the lower the TFE and HFP yield and the higher the OFCB yield. The high HFP yield at low pressures can be contributed to the long gas residence time inside the reactor (typically 1 minute). Very little TFM was formed as might be expected.

Whenever the desired product gas composition is not accomplished by the depolymerization reaction the composition can be optimised by means of a post reactor. The post reactor 38 is usually installed between the outlet 36 and the quench probe 40. This reactor is typically operated under different conditions than the paddle reactor 12. For example, in the experiments summarised in Table 7 the object was to optimise the HFP yield by post reacting a crude gas such as that generated by the paddle reactor 12. This can be achieved by tuning the post reactor 38 to specific operating conditions favourable for the formation of HFP. The advantage is that such polishing can happen in situ without the crude product gas being handled in between at all.

In order to demonstrate that conversion of TFE into HFP can be done effectively by a post reactor, even if the reactor and its conditions were not yet optimised, a post reactor 38, made of a ½ inch stainless steel tube, 1.5 meters in length and designed for a TFE flow rate of 1 kg/h was mounted downstream of a vertical depolymerization reactor such as that described in WO 01/58584. This was done to be able to sample the crude product gas before it enters the post reactor. For the purpose of these tests the upstream vertical reactor was operated under conditions similar to the fourth sample in Table 6 (i.e. 90 kPa at 600° C.) and the post reactor at a temperature of 800° C. and an absolute pressure of 88 kPa, i.e. all at near ambient atmospheric pressure.

Table 7 summarizes two distinct experiments on unfilled PTFE with the post reactor in place (Sample 1 & 2), which must be judged against the independent control run (first row, Table 7) sampled from the vertical depolymerization reactor before treatment with the post-reactor. In Sample 1 the conversion rate of TFE into other products was a surprising 96% (only 2.6% of the 73.3% TFE remained). Amongst the conversion products more than 70% was converted into HFP (at least [75.1% (HFP)−18.3% (HFP)] of [73.3% (TFE)−2.6% (TFE)+8.5% (OFCB)]=72%). In total the HFP concentration

TABLE 6

Products from graphite filled PTFE depolymerization in a paddle reactor

| Pressure kPa | Temp °C. | TFM ($CF_4$) | HFE ($C_2F_6$) | TFE ($C_2F_4$) | OFP ($C_3F_8$) | HFP ($C_3F_6$) | OFCB (c-$C_4F_8$) | PFIB ($C_4F_8$) |
|---|---|---|---|---|---|---|---|---|
| 10 | 600 | 2.47 | 10.63 | 28.43 | 0.00 | 49.06 | 9.42 | 0.00 |
| 30 | 600 | 5.64 | 17.04 | 30.79 | 9.42 | 30.22 | 6.89 | 0.00 |
| 60 | 600 | 2.24 | 9.41 | 27.67 | 7.79 | 34.18 | 14.65 | 4.07 |
| 90 | 600 | 0.15 | 1.74 | 14.91 | 1.59 | 28.82 | 47.20 | 5.59 |
| 120 | 600 | 0.39 | 3.13 | 16.39 | 4.89 | 27.08 | 36.25 | 11.87 |
| 130 | 600 | 0.79 | 5.69 | 0.70 | 12.40 | 18.97 | 35.20 | 26.26 |
| 140 | 600 | 0.76 | 5.46 | 2.28 | 12.15 | 18.74 | 33.73 | 26.87 |

Table 6 summarizes the results of tests that were conducted without the post reactor 38. The reactor conditions were selected primarily to produce HFP and OFCB at the selected temperature of 600° C. During these experiments the quench was raised to 75.1% of the final product. Unfortunately, during this experiment 13.5% of the product was converted to the undesirable, highly toxic PFIB. The quench system was subsequently optimised where after the yield of PFIB was reduced to 7.6% (Sample 2). However, the HFP yield dropped to 64.9%, but the OFCB yield increased to 10.6%. It is envisaged that with further optimisation the PFIB formation can be reduced to acceptable levels. TFE, HFP and OFCB are the high value products that are sought after.

TABLE 7

HFP optimisation in polishing reactor from TFE

| Sample | TFE ($C_2F_4$) | OFP ($C_3F_8$) | HFP ($C_3F_6$) | PFB ($C_4F_{10}$) | Other ($C_4F_8$)'s | OFCB (c-$C_4F_8$) | PFIB ($C_4F_8$) |
|---|---|---|---|---|---|---|---|
| Control | 73.3 | 0.0 | 18.3 | 0.0 | 0.0 | 8.5 | 0.0 |
| 1 | 2.6 | 1.2 | 75.1 | 0.0 | 7.6 | 0.0 | 13.5 |
| 2 | 12.0 | 0.0 | 64.9 | 0.0 | 4.9 | 10.6 | 7.6 |

The depolymerization of filled PTFE was successfully performed and the depolymerization product was successfully converted to HFP as an example of the ease of optimizing the system for a specific product. This system could be operated at a variety of temperatures and pressures and optimised for a wide variety of products including $C_1$, $C_2$, $C_3$, and $C_4$ fluorocarbon products, ie. fluorocarbon products having 1, 2, 3 and 4 carbon atoms.

The Applicant is aware that depolymerization of PTFE can be performed by different processes such as in a rotating kiln reactor in the presence of steam, or in a fluidized bed reactor in the presence of steam, or in a static oven where the depolymerization process takes place in batches. These processes can make use of various heating sources such as resistance heating, gas heating or radio frequency (RF) induction heating. The product yield for TFE is usually improved by performing the process under reduced pressure up to near vacuum. Since vacuum-tightness has proven to be difficult in a rotary kiln, steam is often used to reduce the partial pressure of the product gas mixture and it simultaneously acts as an additional heating source. It is also used to reduce air leakage into the product stream in view of the explosive nature of TFE. However, the disadvantages of steam systems are the large amount of waste that is generated (for example dilute hydrogen fluoride (HF) effluent—see Table 5), expensive materials of construction that are required to eliminate corrosion problems, high operating cost, additional utilities like steam generators, effluent handling facilities, etc. These disadvantages are substantially minimised when the depolymerization process takes place without the addition of a carrier gas such as steam or any other inert gas.

In case of a fluidised bed reactor a disadvantage of using steam as the fluidising agent and heat source is the clogging and tunnelling of the very viscous molten PTFE phase. This may demand either batch operation with intermittent cleaning steps or means of continuous agitation while maintaining the bed stable and fluent.

The carrier-gas free depolymerization of, for example, PTFE that can be achieved with the present invention, can be used to obtain high purity TFE, since no contaminating carrier gas, which is usually in excess, has to be removed. Other main products that also form are HFP, hexafluoroethane (HFE), octafluoropropane (OFP) and OFCB. The process of the invention also allows for optimization for any one of these products.

The biggest concern in PTFE depolymerization reactors is the formation of hot viscous PTFE or low molecular mass solid PTFE that tends to cause blockages, which is a real, intrinsic problem in the known PTFE depolymerization processes and reactors. After several extensive experimental runs, there proved to be no blockages in the reactor 12. Tests were also performed to evaluate the residence time of solid PTFE inside the reactor. This was found to be dependent on the tilt angle of the reactor and the speed of the paddle screw.

The experimental results obtained indicate that by means of the process and installation of the present invention, various fluoropolymers can be depolymerised and their residues handled successfully and continuously with no blockages of the reactor. Depending on the desired product mix, it is also possible to alter the product slate by incorporating a post reactor, as hereinbefore described.

As opposed to the disadvantages of steam depolymerization, this invention presents a novel process and installation where carrier-gas free depolymerization is effected in an essentially horizontal, stationary reactor 12 with an axially rotating paddle-screw arrangement 19 at pressures above or below ambient pressure conditions and at different reactor temperatures.

The installation 10 is able to depolymerise filled as well as unfilled fluoropolymers, for example PTFE. Utilising the present paddle oven, similar results as those for conventional depolymerization methods are achieved. The advantages of the process and installation of the invention over conventional depolymerization processes include:

Continuous depolymerization of fluoropolymers such as filled PTFE under a range of pressure conditions of materials that conventionally require batch processing
Simplicity of operation
Less waste generated
Lower operating cost The installation 10 may also be operated with a carrier gas if the need for this arises.

The invention claimed is:
1. A process for depolymerizing fluoropolymers, comprising
continuously feeding a solid fluoropolymer, in particulate form, into a more-or-less horizontally orientated cylindrical first reaction zone, with the fluoropolymer particles entering the first reaction zone at or near one end thereof, with no carrier gas for the fluoropolymer particles being employed;
continuously rotating, within the first reaction zone, a central axle from which protrudes at least one paddle, with the rotating paddle serving to advance the fluoropolymer particles along the first reaction zone while agitating them;
as the fluoropolymer particles pass along the first reaction zone, subjecting them to an elevated temperature of 400° C. to 1000° C., thereby to depolymerise the fluoropolymer into a fluoro-containing compound-rich gas phase, with no steam being used in the reactor;
if necessary, withdrawing a residual solids phase at or near the other end of the first reaction zone;

withdrawing the gas phase at or near the other end of the first reaction zone;

optionally, passing the gas phase through a second reaction zone which is also at an elevated temperature; and quenching the gas phase to less than about 200° C. in less than 1 second, thereby to recover the fluoro-containing compounds as gaseous products.

2. The process according to claim 1, wherein the fluoropolymer is polytetrafluoroethylene ('PTFE') with the fluoro-containing compounds comprising tetrafluoroethylene ('TFE'), hexafluoropropylene ('HFP'), hexafluoroethane ('HFE'), octafluoropropane ('OFP') and octafluorocyclobutane ('OFCB') and its isomers.

3. The process according to claim 1, wherein the fluoropolymer particles vary in size from about 5 mm up to chunks of a few centimeters.

4. The process according to claim 1, wherein a plurality of sets of paddles are provided in the first reaction zone, with the blades of one set being spaced longitudinally along the axle relative to those of an adjacent set, and with each set of blades comprising a number of blades spaced apart around the axle.

5. The process according to claim 1, wherein the rotational speed of the axle in the first reaction zone is between about 1 and 20 rpm.

6. The process according to claim 1, wherein the reaction pressure in the first reaction zone is from about 1 to 300 kPa(a).

7. The process according to claim 1, wherein the residence time in the first reaction zone is from about 1 to 30 minutes.

8. The process according to claim 1, further comprising the second reaction zone, with the residence time of the gas phase in the second reaction zone being less than about 5 minutes.

9. The process according to claim 8, wherein the reaction temperature in the second reaction zone is from about 100° C. to 1000° C.

10. The process according to claim 8, wherein the reaction pressure in the second reaction zone is from about 1 to 300 kPa(a).

11. The process according to claim 1, wherein the rotational speed of the axle in the first reaction zone is between 1 and 5 rpm.

12. The process according to claim 6, wherein the reaction pressure in the first reaction zone is from 5 to 88 kPa(a).

* * * * *